United States Patent
Papenbreer et al.

(10) Patent No.: US 9,897,990 B2
(45) Date of Patent: Feb. 20, 2018

(54) SAFETY CONTROLLER WITH RAPID BACKUP AND CONFIGURATION

(71) Applicant: Rockwell Automation Germany GMBH & Co. KG, Wuppertal (DE)

(72) Inventors: Rudolf Papenbreer, Wuppertal (DE); Thomas Helpenstein, Grevenbroich (DE); Norbert Machuletz, Wetter (DE); Oliver Heckel, Frechen (DE); Mussa Tohidi Khaniki, Wuppertal (DE); Bradley A. Prosak, Shaker Heights, OH (US)

(73) Assignee: Rockwell Automation Germany GMBH & Co. KG (DE)

( * ) Notice: Subject to any disclaimer, the term of this patent is extended or adjusted under 35 U.S.C. 154(b) by 359 days.

(21) Appl. No.: 14/703,435

(22) Filed: May 4, 2015

(65) Prior Publication Data
US 2016/0327923 A1 Nov. 10, 2016

(51) Int. Cl.
*G05B 19/048* (2006.01)
*G06F 3/06* (2006.01)

(52) U.S. Cl.
CPC .......... *G05B 19/048* (2013.01); *G06F 3/065* (2013.01); *G06F 3/0619* (2013.01); *G06F 3/0632* (2013.01); *G06F 3/0679* (2013.01); *G05B 2219/24024* (2013.01)

(58) Field of Classification Search
CPC ........ G05B 19/048; G05B 2219/24024; G05B 2219/24; G05B 2219/24007; G05B 2219/24008; G06F 3/0619; G06F 3/0632; G06F 3/065; G06F 3/0679
See application file for complete search history.

(56) References Cited

U.S. PATENT DOCUMENTS

| | | | | |
|---|---|---|---|---|
| 2006/0224811 A1* | 10/2006 | Sichner | ............ | G05B 19/0428 710/306 |
| 2008/0209211 A1* | 8/2008 | Grgic | ............. | G06F 21/6236 713/166 |
| 2012/0269341 A1* | 10/2012 | Hoffmann | .......... | G05B 19/0428 380/28 |
| 2016/0325754 A1* | 11/2016 | Stahulak | ............ | B60W 40/08 |

FOREIGN PATENT DOCUMENTS

| | | |
|---|---|---|
| DE | 202007016901 U1 | 2/2008 |
| EP | 2711798 A1 | 3/2014 |

OTHER PUBLICATIONS

Extended European Searth Report dated Oct. 12, 2016; Application No. 16168141.6—(9) pages.

* cited by examiner

*Primary Examiner* — Dennis M Butler
(74) *Attorney, Agent, or Firm* — Boyle Fredrickson, SC (57) ABSTRACT

A safety controller and system of safety controllers and a removable memory module for rapid configuration and/or backup of safety controllers are provided. The safety controller comprises a non-volatile memory and one or more slots configured to host modules. A predetermined slot of the one or more slots is configured to communicatively couple the safety controller with a memory module. The safety controller is configured to transfer a backup of a configuration on the safety controller to a memory module hosted in the predetermined slot and configured to load a configuration from a memory module hosted in the predetermined slot. A method of distributing software to a plurality of industrial safety controller comprises utilizing a memory module.

20 Claims, 3 Drawing Sheets

SAFETY CONTROLLER WITH RAPID BACKUP AND CONFIGURATION

BACKGROUND OF THE INVENTION

The present disclosure relates generally to industrial automation and control systems, such as those used in industrial and commercial settings. More particularly, the present disclosure relates to high reliability or industrial safety controllers appropriate for use in devices intended to protect human life and health and specifically to rapid backup or configuration of industrial safety controllers by means of a memory module.

Industrial controllers are special purpose computers used in controlling industrial processes. Under the direction of a stored, controlled program, an industrial controller examines a series of inputs reflecting the status of the controlled process and changes a series of outputs controlling the industrial process. The inputs and outputs may be binary, i.e. on or off, or analog, providing a value within a substantially continuous range. The inputs may be obtained from sensors attached to the controlled process and the outputs may be provided to actuators on the controlled process.

Safety systems are systems intended to ensure the safety of humans working in the environment of an industrial process. Such systems may include the electronics associated with emergency stop buttons, light curtains and other machine lockouts. Traditionally, safety systems have been implemented by a set of redundant circuits separate from the industrial control system used to control the industrial process with which the safety system is associated. Such safety systems have been hardwired from switches and relays, including specialized safety relays which provide comparison of redundant signals and internal checking of all conditions, such as welded or stuck contacts.

Safety control can be implemented in various manners, depending on the required control complexity and safety complexity, which takes into account the number of controlled zones. A safety controller can be provided in the form of a safety relay for local, small-scale and/or simple safety control, as a module for a modular, more complex configuration or as a more sophisticated but still compact programmable logic controller, fulfilling certain safety ratings. A compact safety controller can be employed within a complex safety network. Safety relays, on the other hand, are particularly useful for small scale emergency stop applications.

A safety device oftentimes is configured to comply with standardized requirements, such as a safety integrity level (SU). On the other hand, it is desirable to enable users to configure not only standard control devices, but also a safety controller or safety relay by means of software, using an editor program. Before enabling full operation of a safety controller configured by means of software, compliance of the safety controller with safety requirements has to be verified so as to increase safety during operation of said safety controller. In order to indicate completion of such a verification process, a safety control program on a safety controller can be supplemented with a verification ID stored as well on the safety controller, or the safety control program is downloaded to the safety controller together with an integrated verification ID. Other means to indicate that a safety control program is verified can be provided.

Traditionally, a safety controller or a safety relay is connected via a network, USB connection or Bluetooth connection to a programming tool or device in order to receive a safety control program, which is also sometimes referred to as a safety control application or safety control project. The safety control program is then downloaded to the safety controller, thereby requiring connecting said safety controller with the programming or editor device.

For OEMs or generally in cases where many machines or controller devices have to be programmed with a common configuration, this is a time-consuming procedure that requires connecting each controller with the device running the editor software and downloading the configuration comprising the industrial control program to the controller. Furthermore, this approach makes it difficult to track whether the same or the intended safety control program is downloaded to the controllers.

In another conventional approach for providing a configuration to industrial controllers, a memory card or module is permanently slotted in a receptacle of an industrial controller. This reduces available space and expandability of the industrial controller. To balance these drawbacks, additional functionality, such as a real-time clock, is conventionally provided on such memory cards or modules permanently slotted in the industrial controller.

BRIEF DESCRIPTION OF THE INVENTION

In one embodiment of the present disclosure, a safety controller comprises non-volatile memory and one or more slots configured to host modules. A slot of the one or more slots, in particular a predetermined slot, which may be the leftmost or rightmost slot, is configured to communicatively couple the safety controller with a memory module. The safety controller is configured to transfer a backup of a configuration on a safety controller to a memory module hosted in the slot and/or configured to load a configuration from a memory module hosted in the slot. Accordingly, a configuration of the safety controller can be transferred to and from the safety controller in a simple manner by using a removable memory module that can be hosted by the safety controller. The memory module does not have to be permanently installed in the slot of the safety controller. Instead, the same slot can be used for other expansion modules, such as I/O modules or communication modules, etc. The configuration and backup of the industrial safety controller according to this embodiment does not require a network or other connection to an editor device, which facilitates rapid distribution during manufacturing of safety controllers or on the factory floor.

According to an aspect, backup and configuration of the safety controller are only possible in a non-operating state, which can be called a "fault state" of operation. This ensures that the safety operation of the safety controller is not affected by processes of backup or loading of a configuration.

According to another aspect, the configuration comprises a verified safety control program and/or a safety controller firmware. Accordingly, a verified safety control program may be transferred together with a safety controller firmware that supports the respective verified safety control program. According to another aspect, a single processing unit having communication functions is provided among two or more processing units of the safety controller and only a predetermined slot is internally connected and provides communicative coupling with said single processing unit having the communication functions. This configuration reduces internal wiring and hardware cost while providing backup and restoring functions for a safety controller. The predetermined slot is furthermore configured to communicatively couple not only with the memory module but at least also with a communication module which may be hosted in the predetermined slot when the memory module is not present.

In another embodiment of the present disclosure, a safety control system for rapid configuration of safety controllers comprises a plurality of safety controllers and a removable memory module. Each safety controller of the system comprises one or more slots configured to host plug-in modules, wherein a slot of the one or more slots, in particular a predetermined slot, is configured to communicatively couple the safety controller with the removable memory module. The memory module is configured to be hosted in one of said slots of the safety controllers. Each safety controller and the memory module are configured for transfer of a backup of a configuration, which may be stored on a memory of the safety controller, to the memory module when the memory module is hosted in the slot of said safety controller and/or for loading a configuration from the memory module to the safety controller when the memory module is hosted in the slot of said safety controller.

In yet another embodiment of the present disclosure, a method of distributing software to a plurality of industrial safety controllers comprises a step of loading a software associated with an industrial safety controller or industrial safety control on a memory module. The memory module subsequently is hosted in a predetermined slot of one or more module slots of an industrial safety controller. Next, the memory module is communicatively coupled via the predetermined slot with the industrial safety controller. Upon initiating a transfer of the software from the memory module to the industrial safety controller, the software is transferred from the memory module to the industrial safety controller and stored in a non-volatile memory of the industrial safety controller.

According to an aspect, the loading comprises hosting the memory module by a first industrial safety controller, determining whether a safety control application on the first industrial safety controller is verified and, if so, loading the software from the first industrial safety controller to the memory module. According to an aspect, the software can be downloaded, such as from a software editor or software configuration tool, to said first industrial safety controller and stored in a non-volatile memory thereof.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

While the present disclosure may be susceptible to various modifications and alternative forms, specific embodiments are shown by way of example in the drawings and are described in detail herein. However, it should be understood that the embodiments are not intended to be limited to the particular forms disclosed. Rather, the disclosure is to cover all modifications, equivalents and alternatives falling within the spirit and scope of the disclosure as defined by the appended claims. Further, although individual embodiments are discussed here in a simplified explanation, the disclosure is intended to cover all combinations of these embodiments.

Figure 1:
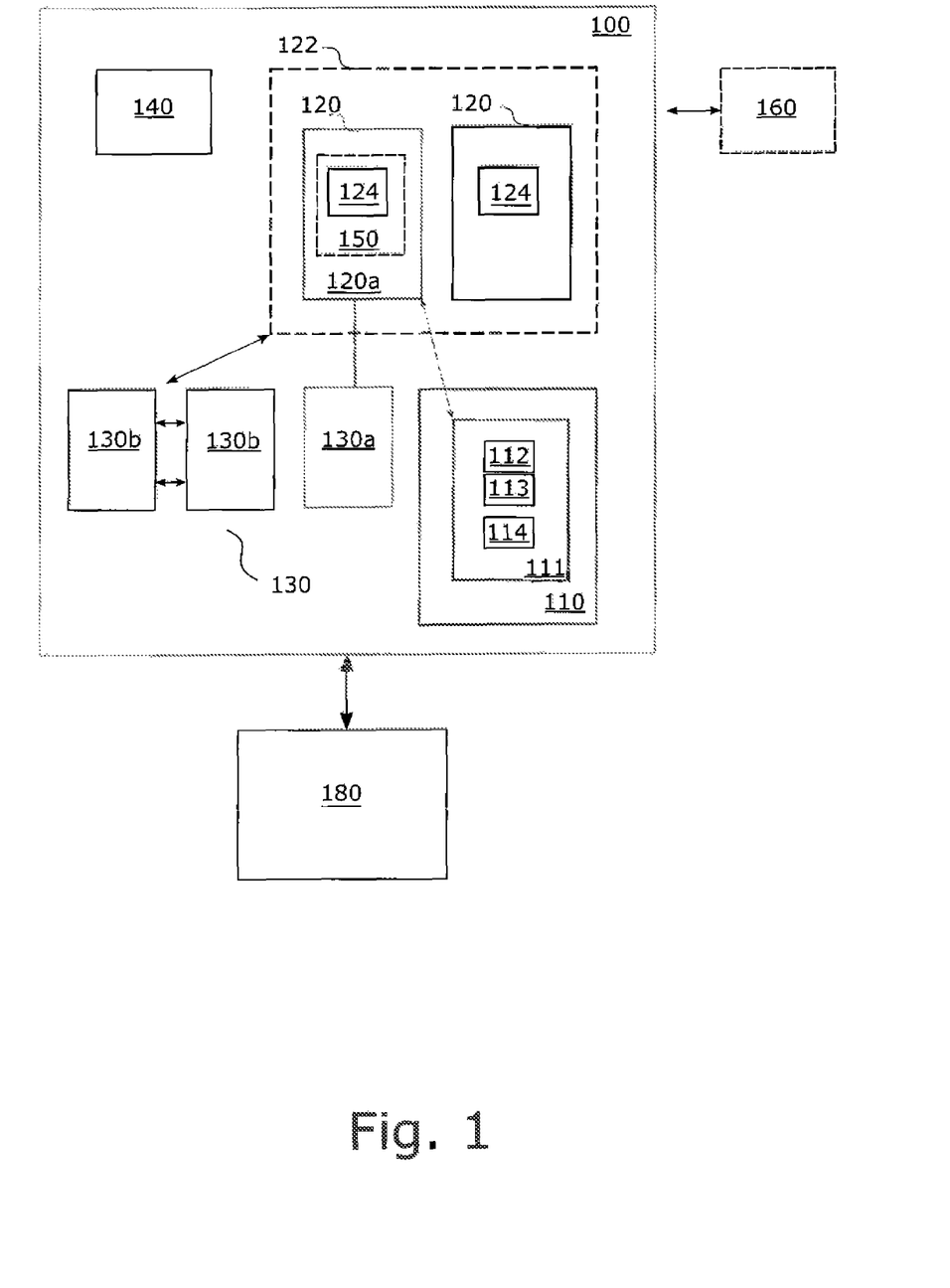
FIG. 1 illustrates a block diagram of a safety controller in accordance with an embodiment.
Figure 2:
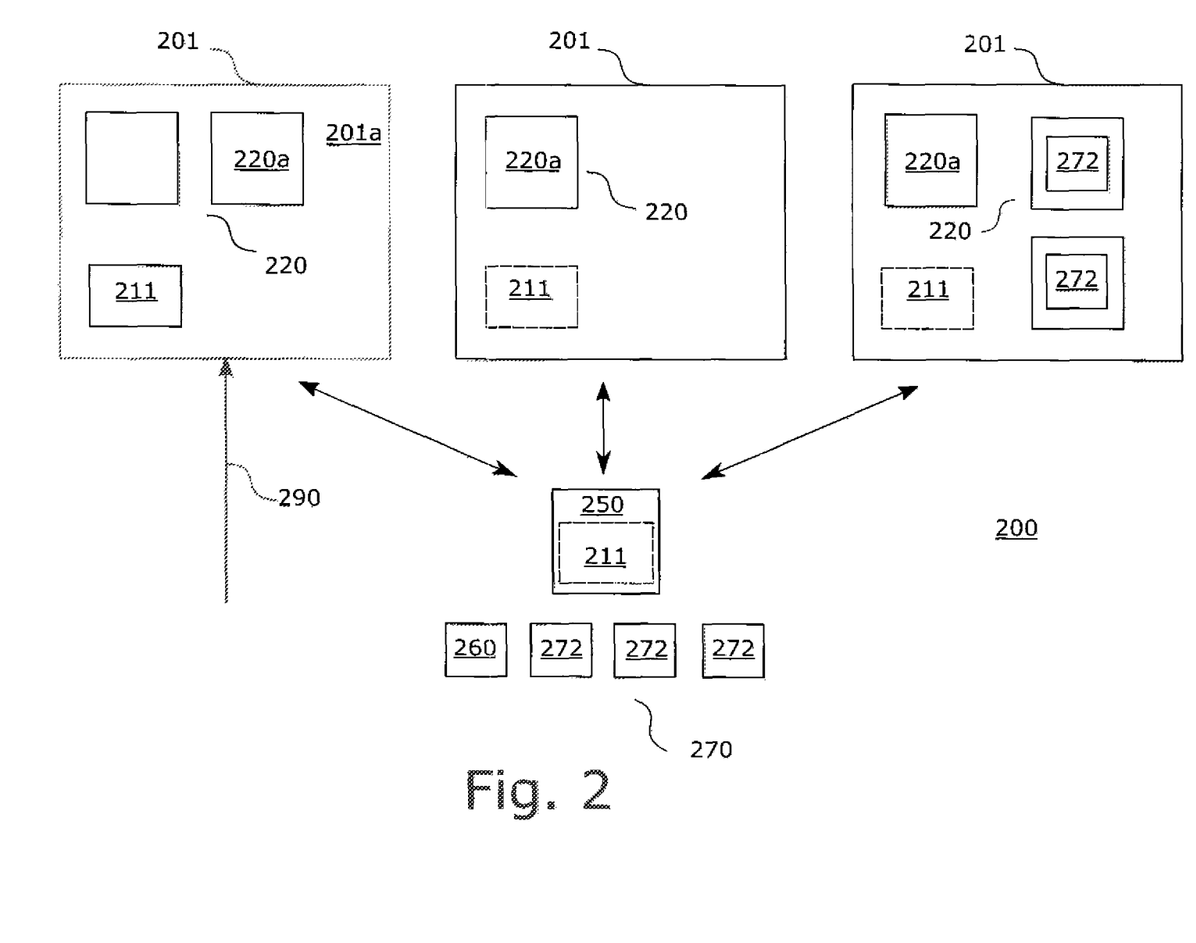
FIG. 2 illustrates a block diagram of a safety control system for rapid configuration of safety controllers in accordance with an embodiment.
Figure 3A:
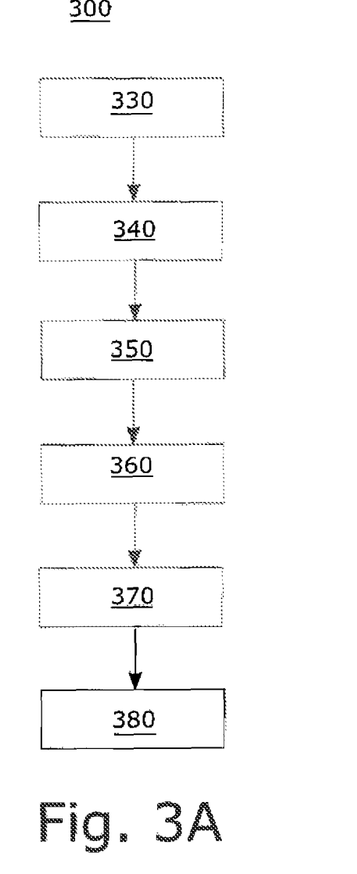
FIG. 3A illustrates a process flow diagram for one method of distributing software to a plurality of industrial safety controllers in accordance with present embodiments.
Figure 3B:
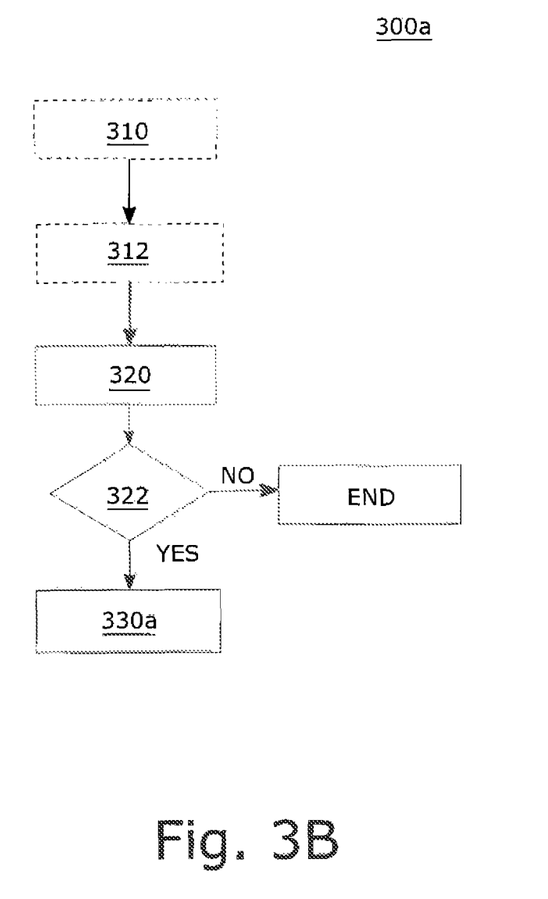
FIG. 3B illustrates another process flow diagram for one method of distributing software to a plurality of industrial safety controllers in accordance with present embodiments.

Specifically, while methods are described with respect to FIGS. 3A and 3B, details, elements and specific aspects disclosed with respect to safety controllers according to embodiments illustrated in relation to FIG. 1, and according to embodiments of safety control systems for rapid configuration of safety controllers as illustrated in relation to FIG. 2 according to the present disclosure are combinable and according to further embodiments disclosed herewith in combination with method steps described in relation to FIG. 3. Further, details and elements described in relation to the embodiments illustrated with FIGS. 1 and 2 according to further embodiments combine with each other, including, in particular, that details and structural elements described in relation to a safety controller according to embodiments described in relation to FIG. 1 are explicitly combinable with the embodiments described in relation to FIG. 2, where not obviously contradictory or defined as relating to strict alternatives.

Further, in the following description of embodiments of the present disclosure, the terms "safety controller" or "industrial safety controller" are to be understood as comprising within their meaning a safety relay, which is a small scale safety controller.

According to embodiments of the present disclosure, a rapid configuration and/or a backup of safety controllers is provided for by means of adapting safety controllers to operate in conjunction with a removable memory module on which firmware of the safety controller or a safety control program, which oftentimes is called a safety control application or safety project, or both, i.e. a safety control program together with a firmware appropriate for running same, can be stored.

In particular, verified safety control programs, which are stored together with a verification ID on a safety controller, can thus be distributed across a multitude of safety control devices, for instance during manufacturing, which is particularly useful for OEMS, or later on the factory floor, specifically where a multitude of safety controllers is to be configured to perform the same safety control program.

It is advantageous not to require network connection or other communicative coupling of each safety controller with a device for downloading the configured safety control program onto each safety controller. This is, in particular, the case for production of safety controllers or where an upgrade or update of firmware and/or an industrial control program of a multitude of safety controllers that are already in place in an automation environment is desired. For instance, different safety control programs, in particular, verified safety control programs, can be stored on different memory modules. Verified safety control programs can thus be duplicated on several devices as needed. By supporting rapid restoration or configuration of safety control software in conjunction with provision of a firmware version or revision of a firmware, support of new functionality, such as new function blocks of control programs, can be provided by means of providing a new firmware version or revision. A more efficient safety control program making use of this new functionality supported by this firmware version or revision can be provided together with said firmware.

Turning now to the drawings and referring first to FIG. 1, an exemplary safety controller 100 is illustrated. The safety controller 100 comprises a non-volatile memory 110, which may comprise writable non-volatile memory and, optionally, read-only memory (ROM), in particular for storing firmware. The safety controller 100 according to embodiments comprises at least two processing units 130. At least one of these is a safety control processing unit 130b that provides high reliability. Redundancy can be provided according to embodiments by having at least two safety control processing units 130b that may operate in an at least partially redundant manner. According to an embodiment, two safety control processing units 130b execute a synchronization program, wherein input signals are synchronized between the two processing units 130b, each safety processing unit 130b subsequently performing safety tasks of a safety control program utilizing said synchronized inputs. Finally, outputs of the safety control programs are compared before each output is provided to an output terminal (not shown) of the safety controller 100. If outputs do not match, the safety controller enters a safety state of operation. The safety controller 100 further comprises a processing unit 130a that supports communication functions for the safety controller 100. According to an embodiment, this processing unit 130a is a standard processing unit that does not execute safety tasks of a safety control program.

The safety controller 100 comprises one or more slots 120 to host modules, in particular plug-in modules. According to embodiments, a module bay 122 includes the slots 120 and each slot 120 comprises a module bay connector 124 for providing at least communicative coupling with a plug-in module. Additionally, power may be supplied from the safety controller 100 to the plug-in modules via a module bay connector 124.

According to present embodiments, a predetermined slot 120a of the one or more slots 120 is configured to communicatively couple the safety controller 100 with a memory module 150 which is not permanently coupled to the safety controller 100. According to embodiments, the predetermined slot 120a may be the only slot 120 configured to provide said communicative coupling with a memory module. Said predetermined slot 120a may also couple to a communication module 160 that provides at least one of gateway functionality, wired network connectivity or wireless network connectivity to the safety controller 100. Wired network connectivity may be provided by means of a serial network communication protocol and interface, and wireless network connectivity may be provided by Bluetooth communication or cellular communication. The safety controller 100 may comprise two slots 120 to host modules and the left or the right slot may be the predetermined slot 120a configured to communicatively couple the safety controller with a memory module 150 and/or a communication module 160.

According to embodiments, only the processing unit 130a not providing safety control functions but providing at least in part communication functions is connected to the predetermined slot 120a to thereby provide communicative coupling between a memory module 150 hosted in the predetermined slot 120a and the processing unit 130a having said communication functions. In this manner, execution of the safety control functions is safeguarded from being affected by replacement of removable modules that provide communication, backup or configuration functions for the safety controller 100, such as by means of a memory module 150. Moreover, hardware costs, in particular in internal wiring or circuitry, and software complexity in respect to enabling all of the processing units 130 of the industrial safety controller 100 to interact with a memory module 150 are reduced. Additionally, as the predetermined slot 120a provides for coupling with the memory module 150 as well as a communication module 160, but according to embodiments also may support communicative coupling with other expansion modules, including I/O expansion modules, no valuable space on the safety controller 100 is lost. According to present embodiments, simple backup or configuration of the safety controller 100 is provided.

According to an embodiment, a safety controller 100 can be provided that has no network connectivity other than through its slots 120, including the predetermined slot 120a, and the communicative coupling to a memory module 150 and/or a communication module 160 provided therewith. This results in an even more reduced hardware part count and cost, and allows for further simplification of the structure of a safety controller 100 while providing the safety functions and upgradability of more complex safety controllers.

A configuration 111 can be stored in the non-volatile memory 110 of the safety controller 100. Such a configuration 111 according to embodiments comprises a verified safety control program 112 and/or a safety controller firmware 114. It is noted that the configuration 111 may also comprise a non-verified safety control program 112 which may be tested during a limited run mode of operation. According to an embodiment, an attempt to prepare a backup of a non-verified safety control program 112 to the memory module 150 is recognized and blocked by the safety controller 100, in order to prevent distribution of non-verified safety control programs 112 which could compromise safety in an industrial automation environment. According to an embodiment, a verified safety control program 112 has an associated verification ID 113 stored therewith. A backup of the verified safety control program 112 on the memory module 150 comprises the verification ID 113 for restoring the verified safety control program 112 together with the verification ID 113 on any other suitable safety controller 100.

According to embodiments, for the purpose of performing a backup of a configuration 111 from the safety controller 100 and of loading of a configuration 111 to the safety controller 100, the safety controller first has to be powered down and the safety controller 100 will, after installment of the memory module 150 and powering on the safety controller 100 again, detect the presence of the memory module 150 and enter a fault state or non-operating state. During the non-operating or fault state, the safety controller 100 does not execute the safety control program currently selected as a running safety control program on the safety controller 100. This ensures that execution of a safety control program is not negatively impacted by processes of backup from or restoring of a configuration to the industrial safety controller 100.

According to embodiments, the safety controller 100 comprises user interface means 140 for initiating the generation of a backup of a configuration to the memory module 150 and/or initiating loading of a configuration 111 from a memory module 150 to the safety controller 100. According to embodiments, the safety controller 100 is configurable by software running on a remote device 180. A configured project can be downloaded to the safety controller 100 as a configuration 111. Further, backup and loading of a configuration from and to the safety controller 100 can be initiated through the editor software running on the remote device 180. According to an embodiment, a backup of both the safety control program 112 and the safety controller firmware can be restricted to be effected only through said editor software.

A loading of a configuration from the memory module 150 to the safety controller 100 can at least in part be initiated by user interface means 140. According to an embodiment, user interface means 140 comprises a button which can be pressed and held for a predetermined period of time to initiate the loading of a configuration 111 from a hosted memory module 150 to the safety controller 100. According to some embodiments, the verification of the initiation of the loading or restoration of a configuration 111 to the safety controller 100 additionally requires activation of a button (not shown) on the memory module 150, while the button 140 on the safety controller 100 is still in an activated state, i.e. pressed down or held. According to embodiments, the initiation and the execution of backup and/or transfer of a configuration 111 to the safety controller 100 can be indicated by LED lights (not shown) on the safety controller 100 and/or on the memory module 150. The same or other indicator LEDs may be used to indicate an unverified run mode, which provides for testing the safety controller 100 during a limited period of time.

Turning now to FIG. 2, an exemplary safety control system 200 for rapid configuration of safety controllers 201 according to present embodiments is illustrated. The system 200 comprises two or more safety controllers 201, which may or may not be connected within an industrial automation network. Each safety controller 201 comprises one or more slots 220 configured to host plug-in modules. As can be seen in FIG. 2, the leftmost safety controller 201 comprises two slots, the safety controller 201 in the middle comprises only one slot 220, and the rightmost safety controller 201 comprises three slots for hosting plug-in modules 220. Each safety controller 201 comprises at least one predetermined slot 220a which is configured to communicatively couple the safety controller 201 with a removable memory module 250.

The removable memory module is configured for being hosted in said at least one predetermined slot 220a of each safety controller 201 of the plurality of safety controllers. According to embodiments, the same predetermined slot 220a may furthermore at least be configured to also communicatively couple the safety controller 201 with a communication module 260, as described in more detail above in relation to FIG. 1. Furthermore, the predetermined slot 220a as well as the other slots 220 are configured to host, in particular, other expansion modules 270, including I/O modules 272, which provide digital and/or analog input and/or output terminals in addition to terminal blocks which usually are already provided on a safety controller 201. According to an embodiment, however, the safety controllers 201 themselves do not have any input and/or output terminal blocks, and are provided with input and/or output functionality by means of one or more I/O expansion modules 272 as needed.

A safety controller 201a is configured to receive a download of a configuration 211 from an external device through a connection 290. The connection 290 can be a serial or parallel network protocol connection, such as typically provided for industrial control networks, or a USB connection. The connection 290 can also comprise wireless networks such as Bluetooth, cellular communication, etc. Accordingly, one of the safety controllers 201, namely safety controller 201a, can be provided with a configuration 211 which can then be distributed to the other safety controllers 201 by way of the removable memory module 250 which can be plugged into the predetermined slot 220a of safety controller 201a and, after completion of a backup of the configuration 211 from safety controller 201a, be removed from safety controller 201a and subsequently hosted in one of the other safety controllers 201. A verified safety control program which can be comprised in the configuration 211 can in this manner be distributed to the other safety controllers 201, although they may not have the means for a connection to an external editor device for downloading a configuration 211.

As shown in FIG. 2, I/O modules 272 can be installed in plug-in slots 220 in a nearly permanent manner, although each expansion module 270 is configured to be removable. Further, a predetermined slot 220a can, for a majority of time, host a communication module 260, which is only replaced temporarily for the purpose of preparing a backup from or loading a configuration to the safety controller 201, to or from a memory module 250, respectively. For this purpose, the communication module 260 is removed from the predetermined slot 220a and replaced by the memory module 250 for a limited period of time for performing the backup or the loading of a configuration to the safety controller 201, utilizing the memory module 250. Several memory modules 250 can be employed within the safety control system 200 for distributing or restoring different safety control programs and/or safety control firmware.

According to an embodiment, a backup of a safety relay project or industrial control program of a safety controller 201 of system 200 is initiated by first powering down the safety controller 201. A dust cover or another plug-in module that is currently located in the predetermined slot 220a, which can be the leftmost slot or the rightmost slot of the slots 220, is removed. The memory module is subsequently snapped into the predetermined slot 220a of the module bay. Next, the safety controller 201 is powered up and the safety controller 201 detects the presence of the memory module 250 and enters a fault state of operation. A fault LED can be provided that indicates the fault state of operation. Other LEDs that can be provided on the safety controller 201 can be used to indicate whether the configuration on the safety controller 201 is verified or not. A user interface button on the memory module 250 can be activated to initiate the backup process and a status LED on the memory module 250 indicates that the backup process has begun. Said status LED stops flashing when the backup operation is complete. According to an embodiment, the verification ID stored on the safety controller 201 can be displayed through LEDs provided on the safety controller

201. At this point, the verification ID displayed on the safety controller 201 can be confirmed to match an expected verification ID of the safety control application to be backed up.

Next, the safety controller 201 is powered down and the memory module 250 is removed from the predetermined slot 220a of the safety controller module bay. The dust cover or the previously installed plug-in module, such as an I/O module 272 or a communication module 260 can be snapped back into the predetermined slot 220a of the module bay and the safety controller 201 can be powered on again to resume normal operation for performing safety control.

According to another embodiment, a safety controller 201 of a safety control system 200 can restore a safety controller project from a memory module 250 using one or more buttons on the memory module 250 and safety controller 201. First, the safety controller 201 is powered down and the dust cover or currently installed plug-in module currently located in the predetermined slot 220a is removed. The memory module 250 is then snapped into the predetermined slot 220a of the module bay of safety controller 201. Next, the safety controller 201 is powered on and detects the presence of the memory module 250 and enters a fault state. A fault LED can be provided, which is lit in solid red and the application logic, including the industrial safety control program, is not executed. At this stage, additional LEDs provided on the safety controller 201 can indicate whether the configuration currently on the safety controller 201 is verified or not.

To initiate the restoration of a verified safety control program on the memory module 250 to the safety controller 201, a user interface button located on the safety controller 201 is activated. While the user interface button on the safety controller is activated, in addition it can be required that a user interface button on the memory module 250 is contemporarily activated to confirm the restoration of the configuration on the memory module 250 to the safety controller 201.

When the restore operation is complete, a status LED on the memory module 250 stops flashing and the LEDs described above which can be provided optionally on the safety controller 201 indicate the verification ID of the currently restored safety application that is restored to the safety controller 201 from the memory module 250. At this stage, the displayed verification ID can be confirmed to match the expected verification ID of the application to be restored from the memory module 250.

Next, the safety controller 201 is powered down and the memory module 250 removed from the predetermined slot 220a of the safety controller module bay. The dust cover, the previously installed plug-in module or another plug-in module that provides desired functionality is snapped back into the predetermined slot 220a of the module bay and the safety controller 201 is powered on to resume normal operation, including performing the restored safety control application on the safety controller 201.

Turning now to FIGS. 3A and 3B, methods of distributing software to a plurality of industrial safety controllers according to present embodiments are illustrated. Referring first to FIG. 3A and according to a first step 330, a software associated with an industrial safety controller or with industrial safety control is loaded on a memory module. The software can comprise a safety control application, safety control program and/or safety controller firmware. According to an embodiment, the software can be loaded in a factory onto a memory module. Further, the software can by loaded by a direct connection between a memory module and an editor tool or software installation device. According to another example, the software can be restored or loaded from a first industrial safety controller that has the software installed thereon, as will be described in more detail below with respect to FIG. 3B and steps 310 to 330a.

In a next step 340, the memory module is hosted in a slot of one or more module slots of an industrial safety controller, in particular a predetermined slot as described above, and, according to a step 350, communicatively coupled with the industrial safety controller via said slot. The communicative coupling may comprise detecting the presence of the memory module in the slot and exchanging one or more messages for initiating communication of the memory module with a processing unit of the industrial safety controller configured to provide communication functions for the safety controller, as described in more detail above in relation to FIG. 1. Transfer of the software from the memory module to the industrial safety controller is initiated in a step 360. This can be accomplished through activation of user interface means, such as pressing a button, input on a touch screen or touch input device or by communicating a command to the safety controller. In response to said initiating, the software is transferred in step 370 from the memory module to the industrial safety controller and the transferred software, in a step 380, is stored in a non-volatile memory of the industrial safety controller.

As noted, the software may comprise a controller firmware, which can be provided with or without a safety control application. If the software comprises a controller firmware, the step of transferring 370 can comprise overwriting an existing controller firmware stored in a read-only memory (ROM) of the industrial safety controller. In other embodiments, the firmware is stored in read/write non-volatile memory.

As noted, the software loaded onto the memory module in step 330 can be a software backed up from a first industrial safety controller. Referring now to FIG. 3B, according to embodiments, the software is downloaded in a step 310 from a software editor or software configuration tool to said first industrial safety controller and stored in a non-volatile memory of the first industrial safety controller. According to other embodiments, the software on the first industrial safety controller can also be loaded from a memory module in a previous loading or configuration process.

According to a step 320, the memory module is then hosted by said first industrial safety controller. According to step 322, a determination can be made as to whether a safety control application on the first industrial safety controller is verified. As explained above, an industrial safety control application can be verified to indicate that the industrial safety control application complies with safety standards and/or requirements. A verification process can be carried out according to a predetermined procedure by manually performing certain actions with a safety controller having the industrial safety control application installed, or it can be performed automatically by a verification tool performing the defined actions for determining a complete verification according to predetermined safety standards and/or requirements. If the safety control application is determined to be verified, the software is loaded in step 330a from the first industrial safety controller to the memory module. The method then can proceed with steps 340 to 380, as described above with respect to FIG. 3A.

According to further embodiments, after the transferred software is stored in step 380 in a non-volatile memory of the industrial safety controller, said industrial safety controller can operate as a first industrial safety controller for providing a backup of the safety control application stored thereon to a memory module and subsequent distribution thereof to other industrial safety controllers.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A safety controller, comprising:
   a chassis including one or more receptacles, wherein:
     each receptacle is configured to receive a module, selected from a plurality of different modules,
     one receptacle, selected from the one or more receptacles, is a predetermined receptacle, and
     the predetermined receptacle is operative to receive a removable memory module;
   a non-volatile memory device contained within the chassis, the non-volatile memory device operative to store a configuration of the safety controller, the configuration including a verified safety control program and a verification ID associated with the verified safety control program; and
   a processing unit contained within the chassis, wherein:
     the processing unit is in communication with the predetermined receptacle,
     the processing unit is configured to detect the removable memory module in the predetermined receptacle at power up,
     the processing unit is configured to enter a non-operative state when the removable memory module is detected in the predetermined receptacle at power up,
     the processing unit is configured to transfer a backup of the configuration from the non-volatile memory device to the memory module hosted in the predetermined receptacle in the non-operative state, and
     the processing unit is configured to load the configuration from the memory module hosted in the predetermined receptacle to the safety controller in the non-operative state, and wherein the backup of the verified safety control program on the memory module comprises the verification ID for restoring the verified safety control program.

2. The safety controller of claim 1, wherein in the non-operative state the processing unit is not executing a safety control program, supports backup of the configuration from the safety controller, and supports loading of the configuration to the safety controller.

3. The safety controller of claim 1, wherein the configuration comprises a safety controller firmware.

4. The safety controller of claim 3, wherein the backup of the verified safety control program on the memory module comprises the verification ID for restoring the verified safety control program together with the verification ID on the safety controller.

5. The safety controller of claim 1, comprising at least two receptacles to host modules,
   wherein only the predetermined receptacle is configured to communicatively couple the safety controller with the memory module or a communication module, the communication module providing at least one of gateway functionality, wired network connectivity or wireless network connectivity to the safety controller.

6. The safety controller of claim 5, further comprising
   at least two processing units comprising only one processing unit having communication functions, only the predetermined receptacle being configured for communicative coupling with the processing unit having the communication functions.

7. The safety controller of claim 6, comprising
   two safety processing units that at least in part operate in a synchronous mode of executing safety tasks; and
   a standard processing unit having the communication functions, wherein the standard processing unit is at least in part separate from the safety processing units.

8. The safety controller of claim 1, further comprising
   user interface means for at least one of initiating generation of the backup of the configuration to the memory module and initiating loading the configuration from the memory module to the safety controller.

9. The safety controller of claim 1, wherein the safety controller is configurable by software running on a remote device, comprising downloading a configured project as the configuration to the safety controller.

10. The safety controller of claim 1, comprising
    a module bay, each receptacle being a top plug-in receptacle of the module bay for hosting plug-in modules and comprising a bay connector.

11. A safety control system for rapid configuration of safety controllers, comprising
    a plurality of safety controllers, each safety controller including:
      a chassis including one or more receptacles, wherein each receptacle is configured to receive a module, selected from a plurality of different modules, and one receptacle, selected from the one or more receptacles, is a predetermined receptacle;
      a non-volatile memory device contained within the chassis, the non-volatile memory device operative to store a configuration of the safety controller, the configuration including a verified safety control program and a verification ID associated with the verified safety control program; and
      a processing unit contained within the chassis, wherein the processing unit is in communication with the predetermined receptacle; and
    a removable memory module configured for being hosted in the predetermined receptacle of each safety controller of the plurality of safety controllers, wherein the processing unit of each safety controller is configured to detect the removable memory module in the predetermined receptacle at power up and to enter a non-operative state when the removable memory module is detected in the predetermined receptacle at power up, wherein
    each safety controller and the memory module are configured for transfer of a backup of a configuration on the safety controller to the removable memory module when the safety controller is in the non-operative state or for loading a configuration from the removable memory module to the safety controller when the safety controller is in the non-operative state.

12. The safety control system of claim 11, further comprising
one or more expansion modules configured for being hosted by one or more of the safety controllers, the expansion modules comprising at least one of a digital input module, an analog input module, a digital output module, an analog output module, and a communication module.

13. The safety control system of claim 11, at least one safety controller of the plurality of safety controllers is configured to receive a download of the configuration via a network or a USB connection.

14. The safety control system of claim 11, wherein each safety controller of the plurality of safety controllers and the memory module are configured for removal of the memory module from the predetermined receptacle after completion of a loading of the configuration from the memory module to the safety controller or after completion of the backup of the configuration from the safety controller to the memory module.

15. A method of distributing software to a plurality of industrial safety controllers, the method comprising steps of:
loading a software associated with an industrial safety controller or with industrial safety control on a memory module;
inserting the memory module in a predetermined slot selected from one or more module slots of a first industrial safety controller selected from the plurality of industrial safety controllers,
powering up the first industrial safety controller with the memory module inserted in the predetermined slot;
identifying that the memory module is inserted in the predetermined slot with a processing unit on the first industrial safety controller during a power up sequence;
entering a non-operative state in the first industrial safety controller when the memory module is identified as being inserted in the predetermined slot during power up;
initiating a transfer of the software from the memory module to the first industrial safety controller when the first industrial safety controller is in the non-operative state;
in response to the initiating, transferring the software from the memory module to the first industrial safety controller; and
storing the transferred software in a non-volatile memory of the first industrial safety controller.

16. The method of claim 15, wherein the software comprises a safety control application.

17. The method of claim 15, wherein the software comprises a controller firmware.

18. The method of claim 17, the transferring comprising the controller firmware overwriting an existing controller firmware stored in a ROM of the first industrial safety controller.

19. The method of claim 16, the step of loading comprising:
inserting the memory module in a predetermined slot on a second industrial safety controller selected from the plurality of industrial safety controllers;
powering up the second industrial safety controller with the memory module inserted in the predetermined slot;
identifying that the memory module is inserted in the predetermined slot with a second processing unit on the second industrial safety controller during a power up sequence;
entering a non-operative state in the second industrial safety controller when the memory module is identified as being inserted in the predetermined slot on the second industrial safety controller during power up;
determining whether a safety control application on the second industrial safety controller is verified with the second processing unit; and
if the safety control application is verified, loading the software from the second industrial safety controller to the memory module with the second processing unit when the second industrial safety controller is in the non-operative state.

20. The method of claim 19, further comprising:
downloading the software from a software editor or software configuration tool to the second industrial safety controller; and
storing the software in a non-volatile memory of the second industrial safety controller.

* * * * *